L. R. HUNT.
SHOCK ABSORBER FOR AUTOMOBILES.
APPLICATION FILED DEC. 4, 1919.

1,406,388.

Patented Feb. 14, 1922.

Witness
C. D. Kesler
Charles P. Culligan

Inventor
Lloyd R. Hunt
By
Attorney

UNITED STATES PATENT OFFICE.

LLOYD R. HUNT, OF LEXINGTON, NORTH CAROLINA.

SHOCK ABSORBER FOR AUTOMOBILES.

1,406,388.　　　　　Specification of Letters Patent.　　Patented Feb. 14, 1922.

Application filed December 4, 1919. Serial No. 342,375.

*To all whom it may concern:*

Be it known that I, LLOYD R. HUNT, a citizen of the United States, residing at Lexington, in the county of Davidson and State of North Carolina, have invented new and useful Improvements in Shock Absorbers for Automobiles, of which the following is a specification.

The present invention relates to shock absorbers for vehicles, and more especially for automobiles, for reducing or minimizing shocks or severe vibrations between the running gear and the body of the vehicle, due to the passage of the vehicle over rough surfaces in the road or pavement. The primary object of the present invention is to provide a simple device of this kind which can be manufactured inexpensively, applied easily and quickly to automobiles generally, and especially to those of the Ford type, without requiring special fitting of the device or alteration of any of the existing parts of the vehicle, and which in operation will effectively control and minimize the rebound of the body of the vehicle due to reaction of the springs, thus minimizing wear and tear on the tires and running gear, reducing strains and vibrations upon the operating mechanism, avoiding spring breakage and also improving greatly the riding qualities of the vehicle.

To these and other ends the invention consists in certain improvements and combinations and arrangements of parts, as will be hereinafter more fully described, the features of novelty being pointed out particularly in the claims at the end of the specification.

In the accompanying drawing :—

Similar parts are designated by the same reference characters in the several views.

Shock absorbers or snubbers embodying the present invention are applicable generally to automobiles of various types and they are particularly adapted to minimize and control the rebound or upward motion of the body of the vehicle due to the reaction or expansion of the vehicle springs, in consequence of the passage of the vehicle over a hole or rough surface in the road or pavement. The preferred embodiment of the invention is shown in the accompanying drawing, and will be hereinafter described in detail as applied to an automobile of one well known type, but it is to be understood that the invention is not restricted in its application to such a particular type of automobile, and furthermore it will be understood that the invention is not restricted to the precise construction shown, as equivalent constructions are contemplated and will be included within the scope of the claims.

Figure 1:
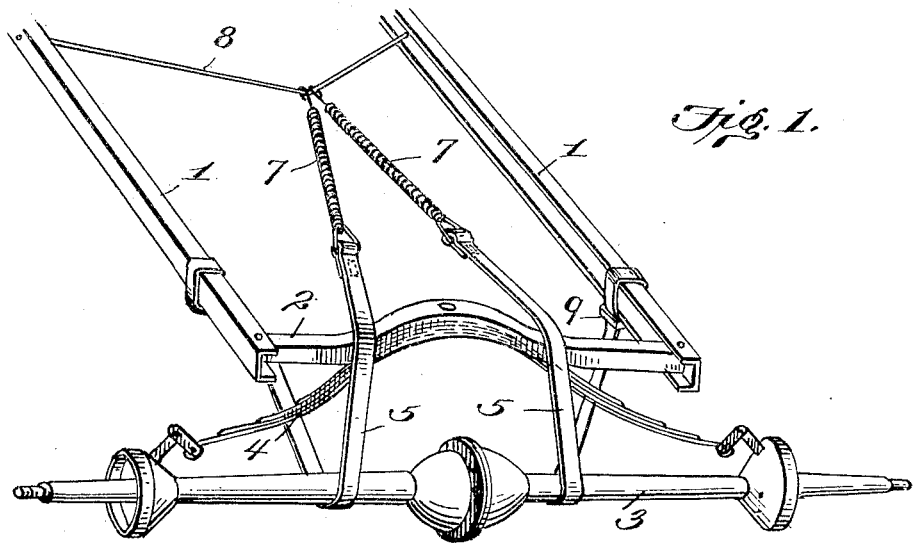
Figure 1 is a perspective view of the rear portion of the chassis of a Ford automobile, equipped with a shock absorber constructed in accordance with the present invention.
Figure 2:
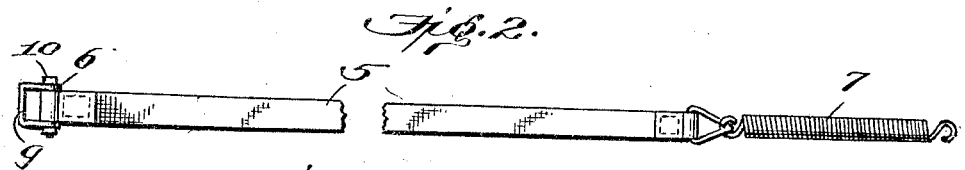
Figure 2 is a detail view of one of the elements of the shock absorber.
Figure 3:
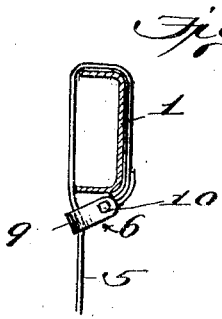
Figure 3 represents a transverse section through one of the side members of the frame of a Ford automobile, illustrating the manner in which the respective shock absorber member is attached thereto.
Figure 4:
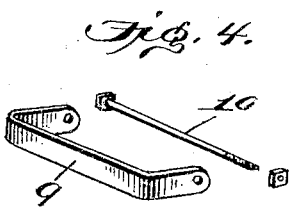
Figure 4 is a detail perspective view of the parts used on each shock absorber element for attaching it to the frame of a vehicle.

In the present instance, a portion of the chassis of an automobile of the Ford type is shown, it comprising side members 1 and a rear cross member 2 of the frame, the rear axle 3 and a spring 4 which is interposed between the axle and the body and serves to resiliently support the body on the axle. Ordinarily the springs between the axles and the frame or body of an automobile are uncontrolled in their action, and as a consequence, when a wheel, or the wheels of an automobile pass over a rough or uneven surface in the road or pavement, the springs become compressed, due to the impact produced between the body and the axles, and this compression of the springs is followed immediately by reaction or expansion of the springs which produces a sudden, and in some cases, a severe rebound of the body of the vehicle which is not only uncomfortable to the occupants, but it strains the springs and frequently causes breakage thereof, it strains the operating mechanism and the running gear, and it also produces undue wear and tear upon the tires. The present invention provides simple, easily applied, and effective means for reducing and appropriately controlling this rebound of the springs. Preferably, and as shown the device comprises a pair of inextensible straps 5 which are preferably composed of leather of appropriate width and thickness, although they may be composed of webbing or other appropriate material of suitable strength, fittings 6 at the ends of the straps by means of which the straps may be attached to the frame or chassis of the vehicle, springs 7 which automatically control the action of the straps 5 in reducing the rebound, and a member 8 by means of which the springs are connected to the chassis of the vehicle. In applying the device to a vehicle, the intermediate portions of the straps 5 are looped under the axle 3 at opposite sides of the center of the axle, and the straps are also passed over the upper rear corners of the rear frame member 2. The ends of the straps which pass under the axle 7 are extended upwardly and forwardly of the axle and are attached to the side members 1 of the frame, while the ends of the straps which pass over the rear member 2 of the frame extend forwardly, they are connected at their forward ends to the tension springs 7 which are preferably of the coil type, as shown, and the forward ends of these coil springs are connected preferably to the middle of a cable or rod 8, the opposite ends of this cable or rod 8 being secured to the side frames of the chassis. By this arrangement the springs 7 which are always under suitable tension, tend to draw the straps 5 against the axle and forwardly across the top of the rear member 2 of the frame, in consequence of which a frictional engagement will be maintained between the straps and the axle and rear frame member. When the vehicle springs 4 are compressed, due to the vehicle passing over a rough or uneven surface in the road or pavement, the vertical distance between the axle and the body or frame of the vehicle is reduced and the springs 7 then act to draw the straps 5 upwardly from beneath the axle and forwardly across the top of the rear frame member 2. When the recoil or reaction of the vehicle springs occurs, sudden rebound of the frame or body of the vehicle is prevented by the straps, as those ends of the straps which pass under the axle are connected directly to the side members of the frame, in consequence of which the upward movement of the frame or body can only take place slowly and as permitted by the sliding of the straps under the axle and over the rear member 2 of the frame, and the frictional resistance to this movement of the straps is afforded by the springs 7 which maintain the straps in frictional engagement with the axle and cross member of the frame. The return of the frame or body to normal position after being depressed is, therefore, gradual instead of sudden. While the shock absorber will effectively prevent sudden rebound between the body and the axles of the vehicle, yet it does not interfere with the usual action of the springs in passing over the ordinary surfaces of the road or pavement, as the relatively slight inequalities in the surface of the road or pavement may be followed by the axle without interference by the strips, owing to the resilience of the springs 7; that is to say, the springs 7 which connect the upper ends of the straps to the frame of the vehicle, will permit relative vertical movement between the axle and the body of the vehicle to a moderate degree, although when the rebound occurs, the force of the rebound is sustained by the opposite ends of the straps which are directly and inelastically attached to the frame. In attaching these ends of the straps to the respective side members of the frame, it is preferable to loop these ends of the straps around the side frame 1, as shown. It is, therefore, preferable to provide this end of each strap with a clevis 9 which may be attached to the end of the respective strap by a screw or bolt 10 which is secured in a doubled portion of the strap, the opposite end of the strap being passed through this clevis, as shown in Figure 3.

I claim as my invention—

1. A rebound check for vehicles of the type having springs for supporting the vehicle frame and body on the axles, comprising a pair of flexible straps having their intermediate portions looped obliquely under and frictionally engaging the axle and looped obliquely over and frictionally engaging a cross member of the frame, each strap having means at one end for attaching it to the respective side member of the frame and having its opposite end arranged to extend longitudinally of the frame and convergently toward its longitudinal center at one side of the cross member over which the strap is looped, and means for tensioning the convergent ends of the straps.

2. A rebound check for vehicles of the type having springs for supporting the vehicle frame and body on the axles comprising a pair of flexible straps having their intermediate portions looped obliquely under the axle and over a cross member of the frame, to frictionally slide on said axle and cross member in consequence of relative vertical movements between the frame and axle, the ends of the straps which are looped under the axle being extended upwardly and divergently outwardly and provided with means for inelastically connecting them to the respective sides of the frame and the ends of the straps which are looped over the cross member of the frame extending convergently inwardly and longitudinally therefrom, and means for tensioning the convergent ends of the straps.

3. A rebound check for vehicles of the type having springs for supporting the vehicle frame and body on the axles comprising a pair of flexible straps adapted to be looped under the axle and over a cross member of the frame to frictionally engage the axle and said cross member, means on the end of each strap which extends beneath the axle for fixing such end of the strap to the respective side member of the frame, a stay stretched between the side members of the frame and spaced longitudinally of the cross member thereof over which the straps are looped, and tensioning means connecting the ends of the straps which are looped over the cross member to said stay.

4. A shock absorber for automobiles comprising a pair of flexible straps, the intermediate portions of which are looped under the axle and over a cross member of the frame, the ends of the straps which are looped under the axle extending divergently upward and having means for attaching them to the respective side members of the frame, and the ends of the straps which are looped over the cross member of the frame being arranged convergently, a stay stretched between the side members of the frame and spaced longitudinally of said cross member, and tensioning means connected to the convergent ends of the straps and to said stay.

In testimony whereof I have hereunto set my hand in presence of two subscribing witnesses.

LLOYD R. HUNT.

Witnesses:
W. H. MENDENHALL,
M. O. WORDCANEY.